June 10, 1941.    E. L. WALL    2,244,929
VARIABLE SPEED HYDRAULIC CLUTCH
Filed Oct. 21, 1939    3 Sheets-Sheet 1

INVENTOR
EDMUND L. WALL
BY
Munn, Anderson & Liddy
ATTORNEYS

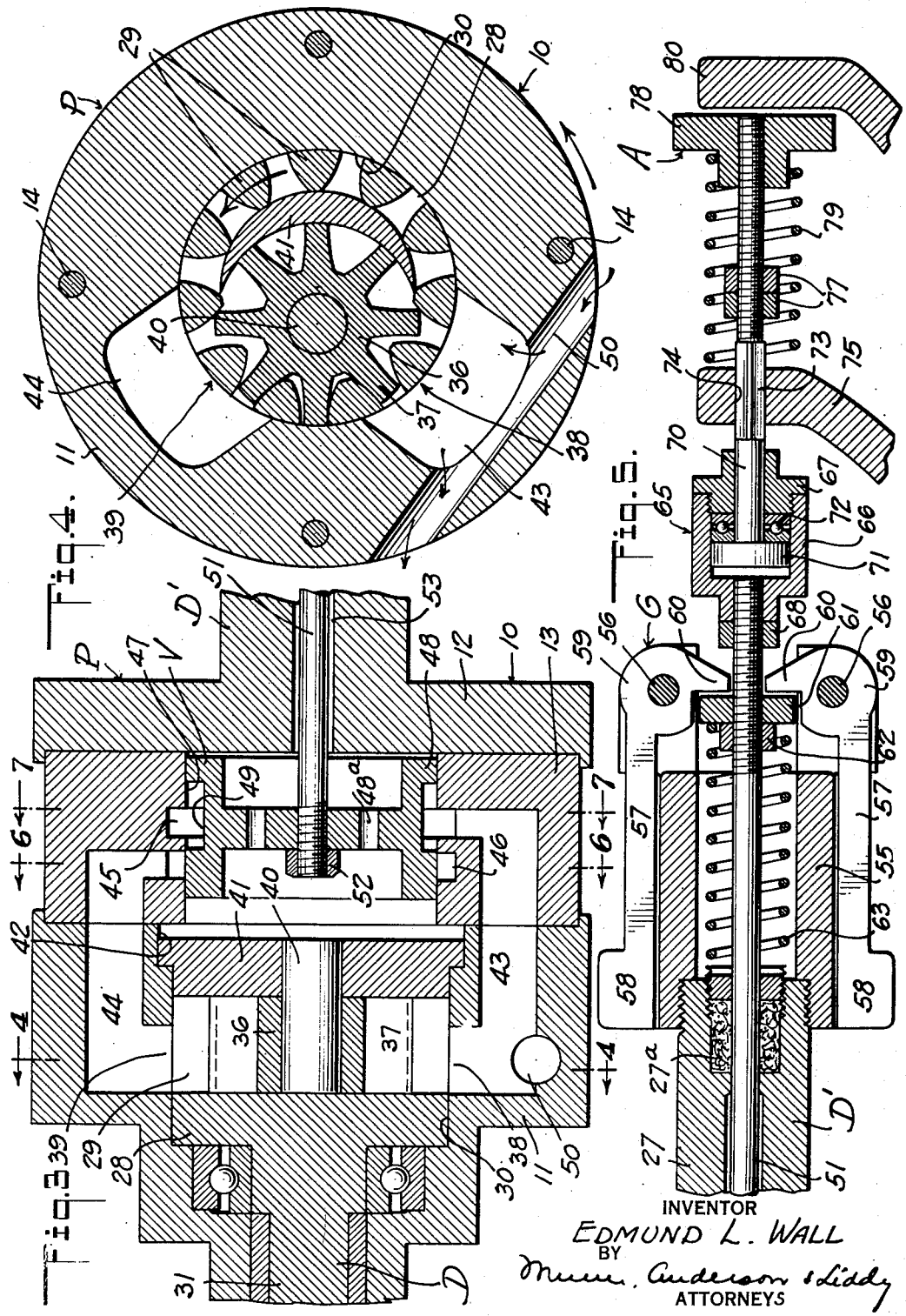

Patented June 10, 1941

2,244,929

UNITED STATES PATENT OFFICE 2,244,929

VARIABLE SPEED HYDRAULIC CLUTCH

Edmund L. Wall, Los Angeles, Calif.

Application October 21, 1939, Serial No. 300,669

10 Claims. (Cl. 192—61)

This invention relates generally to power transferring mechanisms and particularly to the variable speed transmission of power from a driving element to a driven element.

An object of this invention is to provide a mechanism which in its association with driving and driven elements enables variable speed ratios therebetween to be obtained by a variable hydraulic coupling having an infinite number of speeds to the maximum provided by the driving element, all in such manner that the hydraulic connection between the elements can be disrupted so that no motion will be transmitted to the driven element, and the driving element will operate idly.

Another object of the invention is to provide a hydraulic clutch which is structurally characterized by simple and positively acting means enabling the driven element to be operated at a constant predetermined speed irrespective of the load imposed thereon within the range of power at the driving element, all with but negligible frictional losses, whereby to supply a highly efficient power transferring mechanism for various classes of machinery including electric motor driven lathes, drill presses, milling machines, boring mills and variable speed transmissions generally.

A further object of the invention is to provide a hydraulic clutch of the above described character wherein the constant speed determining means can be readily adjusted to vary the constant speed at which the driven element will be operated, irrespective of the load imposed thereon.

A still further object of the invention is to provide a variable speed hydraulic power transmission mechanism embodying a hydraulic pump providing the coupling between the driving and driven elements, which pump operates in a liquid reservoir and includes means to insure an interchange of liquid between that liquid being circulated in the pump during its operation, and the reservoir liquid, so as to obviate any possibility of such overheating of the pump circulating liquid as would reduce its efficiency and adversely affect the hydraulic connection between the driving and driven elements.

With these and other objects in view, the invention resides in the combinations, arrangements and functional relationships of elements as set forth in the following specification and particularly pointed out in the appended claims.

In the accompanying drawings—

Figure 3 is an enlarged fragmentary sectional view of a pumping mechanism embodied in the invention;

Figure 4 is a transverse sectional view taken on the line 4—4 of Figure 3;

Figure 5 is an enlarged fragmentary sectional view of a governor mechanism embodied in the invention;

Figure 1:
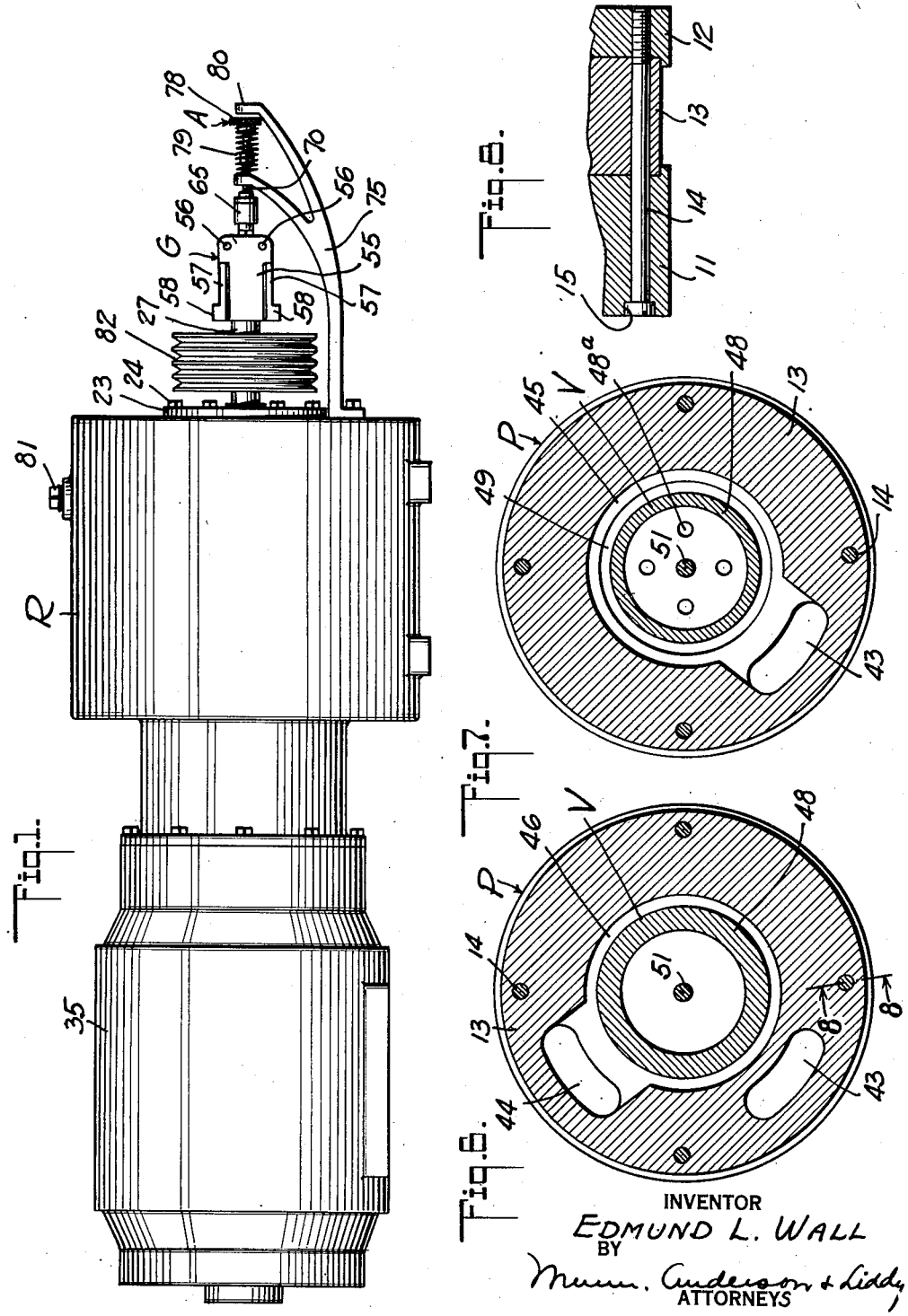
Figure 1 is a view in side elevation of the variable speed hydraulic clutch embodying this invention.

Figures 6 and 7 are reduced scale transverse sectional views taken on the lines 6—6 and 7—7, respectively, of Figure 3;

Figure 8 is a fragmentary detail sectional view taken on the line 8—8 of Figure 6.

Referring specifically to the drawings, the invention in its present embodiment comprises in its broad aspect, a hydraulic pumping mechanism P operating in a liquid reservoir R and forming the hydraulic operative connection between a driving element D and a driven element D' under the control of a valve mechanism V automatically actuatable by a governor mechanism G -the action of which can be varied or rendered ineffective by manually settable means A which can also be adjusted to disrupt the hydraulic operative connection and enable the driving element to operate idly.

The pumping mechanism P is composed of a cylindrical casing 10 constructed of end sections 11 and 12 and an intermediate section 13 rigidly secured together in liquid-sealed relationship by socket-head cap screws 14, the heads of which seat flush in counterbores 15 in the section 11 so as to eliminate an obstruction which would tend to churn liquid in the reservoir R during rotation of the casing therein.

The end sections 11 and 12 are reduced in diameter to form journals 16 and 17 mounted in anti-friction bearings 18 and 19 supported in boxes 20 and 21, the former of which projects inwardly from an end wall 22 of the reservoir. The box 21 includes a plate 23 secured by bolts 24 to the opposite end wall 25 of the reservoir and projects through an opening 26 in the latter.

The casing 10 forms part of the driven element D' specifically a shaft 27, which is an extension of the end section 12 and projects through the box 21 and through a packing gland 27a therein.

The driving element D is formed by the rotor 28 of the pumping mechanism which is a cylindrical body having teeth 29 and working in a cylindrical chamber 30 in the casing, the rotor including a shaft 31 which projects from the casing through a packing gland 32 in the box 20 and is operatively connected by a splined coupling 33 to the shaft 34 of a prime mover such as a constant speed electric motor 35.

An idler 36 having teeth 37 meshing internally with the teeth 29 of the rotor 28 between suction and discharge ports 38 and 39 in the housing section 11, is freely rotatable on a pin 40 supported by a closure plate 41 press-fitted in an annular recess 42 to close the open end of the chamber 30 in the casing section 11.

The ports 38 and 39 are continued by U-shaped passages 43 and 44, respectively, in the casing sections 11 and 13, to communicate with annular ports 45 and 46 opening into a cylindrical valve chamber 47 in the casing section 12, and controlled by a balanced valve 48, which is a part of the valve mechanism V. The valve 48 is in the form of a cylindrical body having an external annular by-pass passage 49 constantly in communication with the annular port 45 and adapted to co-act with the annular port 46 in conducting liquid from the discharge side of the pump to its inlet side during operation of the pump so as to enable uni-directional circulation of liquid to be effected in the pump casing by the action of the rotor 28 and the idler 36 and in variable volume, dependent on the axial position of the valve 48.

An intercommunicating passage 50 between the suction passage 43 and the liquid space of the reservoir R extends in the casing section 11 across the suction passage 43 opposite the suction port 38 and opens at opposite ends to the periphery of the section 11 in tangential relationship thereto. Thus during rotation of the casing 10 in a body of liquid such as oil in the reservoir R, oil will be forced from the reservoir through the passage 50 from one end or the other thereof, depending on the direction of rotation of the casing, and intermix in part with the pump-circulated oil, whereas oil being circulated through the pump will in part discharge from the suction passage 43 and through the passage 50 so as to discharge from the other end thereof into the reservoir, all as shown by the arrows in Figure 4, thus effecting an interchange of liquid in the pump and liquid in the reservoir in order to effectively prevent overheating of liquid by the pump which might occur should the same relatively small quantity of liquid be circulated in the pump.

The valve 48 is provided with one or more balancing ports 48a in order to render the valve "full floating" in the chamber 30 and thus enable the axial movement of the valve in the chamber to be free and unrestricted by the liquid in the chamber.

The valve 48 is threaded on one end of a valve rod 51 and is secured thereto by a nut 52. The rod 51 extends freely through an axial bore 53 in the casing section 12 and driven shaft 27 and through a packing gland 54 in the outer end of the latter. The governor mechanism G is supported from the outer end of the driven shaft 27 and is composed of a tubular support 55 threaded on the shaft 27 in co-axial relationship thereto and having diametrically opposed pins 56 on which arms 57 carrying governor weights 58 are fulcrumed by means of hubs 59. Relatively short arms 60 project radially inward from the hubs 59 for engagement with a collar 61 threaded on the rod 51 and secured in a selected position of axial adjustment thereon by a jam nut 62 threaded on the rod to abut the collar.

A coil spring 63 surrounds the rod 51 in the support 55 and engages the collar 61 to urge the rod axially in a direction to effect closing movement of the valve 48 with respect to the annular port 46 against the action of the governor weights 58 during rotation of the driven shaft, the latter functioning to reversely actuate the rod and effect opening movement of the valve 48 with respect to the port 46.

The spring 63 is preset to control the weights 58 at a low speed which in practice can be 100 R. P. M., and in a manner to be later more fully described.

To the outer end of the rod 51 which is disposed beyond the support 55 is connected a coupling 65, in the form of a cup-shaped body 66 having its open end closed by a cap 67 threaded thereon, and its other end threaded in the rod 51 and locked thereto by a nut 68.

An adjusting shaft 70 extends freely through the cap 67 and is provided in the body 66 with a head 71 abutting a ball thrust bearing 72 confined in the body by the cap 67. The shaft 70 is provided with a non-circular portion 73 slidable in a complementarily shaped bore 74 in a bracket 75 secured to the reservoir R, so as to support the shaft 70 co-axially of the rod 51 against rotation, yet permit axial movement of the shaft.

The outer end of the adjusting shaft 70 is threaded to receive a pair of stop nuts 77 and a knurled adjusting knob 78 against which abuts one end of a coil spring 79 surrounding the shaft 70 and having its other end abutting the bracket 75 for co-action with the spring 63 in resisting the functioning of the governor weights 58 under the action of centrifugal force.

Figure 2:
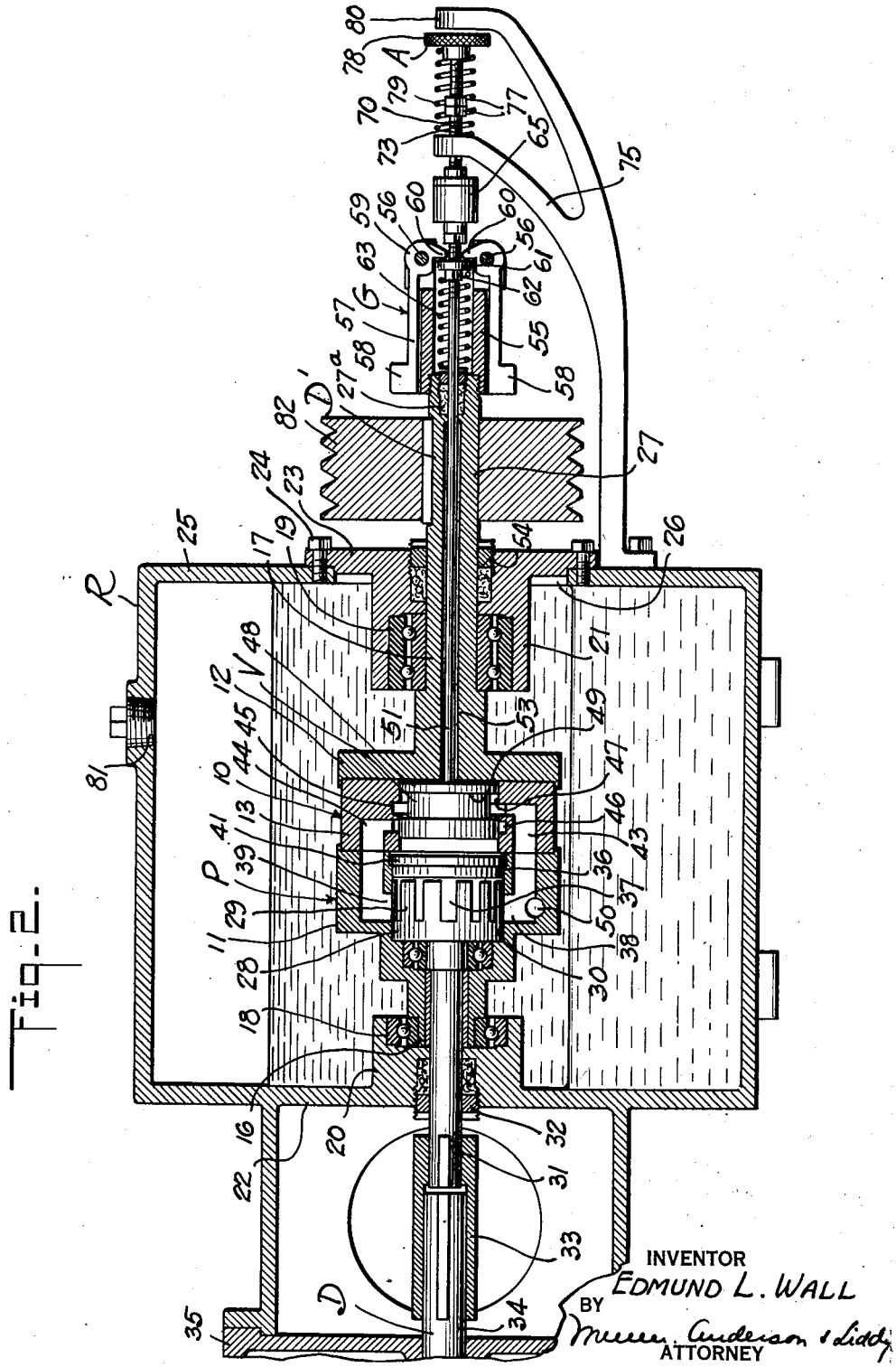
Figure 2 is a longitudinal sectional view of the invention.

A stop member 80 projects from the bracket 75 and is adapted to be engaged by the knob 78 when screwed to the right in Figure 2 to force the valve 48 to and maintain it in its fully opened position with respect to the annular port 46 so as to disrupt the hydraulic operative connection between the driving element D and the driven element D' and permit the driving element to rotate idly, all in the operation of the invention, which is as follows:

Let it be assumed that the reservoir R has been supplied through the plug controlled opening 81 with a suitable liquid, such as a high grade lubricating oil, to the level shown in Figure 2, so as to submerge the pumping mechanism P in the oil.

Let it also be assumed that the spring 63 has been loaded to control the governor weights 58 at a predetermined low speed which, as an example, is 100 R. P. M., and that the spring 79 has been loaded to assist the spring 63 so that by their combined loadings a selected constant speed of the driven element D' will be maintained by the automatic action of the governor mechanism G upon the valve mechanism V, irrespective of the load imposed on the driven element.

With the loadings of the springs 63 and 79 being such that the driven element is to operate at a selected constant speed of 1000 R. P. M., which is, of course, somewhat less than that of the constant speed motor 35 at its rated horsepower, operation of the motor will initially drive the driven element D' at the same speed as the driving element D due to the fact that the valve 48 is fully closing the annular discharge port 46 to positively prevent any circulation of liquid through the pumping mechanism, thus locking the casing 10 to the rotor 28 through the medium of the liquid.

However, the governor weights 58 instantly swing outwardly against the combined resistances of the springs 63 and 79 to a position in which the arms 60 will co-act with the collar 61 in adjusting the valve 48 to open the annular port 46 to such extent that a sufficient volume of liquid will be circulated through the pump by the co-action between the rotor 28 and idler 36, to reduce the speed of the driven element D' to the selected speed.

Should the load applied to the driven element D' through the medium of a power take-off pulley 82 or other means increase or decrease, with a proportionate temporary decrease or increase in the speed of the driven element, the governor weights 58 will instantly act in one direction by centrifugal force and in the other direction by the urging action of the springs 63 and 79, to accordingly adjust the valve 48 by permitting more or less liquid to be circulated, thus automatically varying the hydraulic coupling between the driving and driven elements so that the preselected speed of the latter will be maintained.

It will be clear that by turning the knob 78 in a direction to advance it on the adjusting shaft 70, the loading of the spring 79 will be increased to accordingly offer more resistance to the action of the governor weights in effecting the opening movement of the valve 48, thus reducing the volume of oil permitted to circulate in the pump, and hence increasing the speed of the driven element D'.

Conversely, adjustment of the knob 78 in the reverse direction will cause the speed of the driven element D' to decrease, and such adjustment, if continued, will reduce the speed of the driven element until the spring 79 becomes inactive, the spring 63 functions alone to maintain the predetermined low speed of 100 R. P. M., or any lower speed upon suitable adjustment of the collar 61 or substitution of the spring 63 by a weaker spring. By the provision of the two springs 63 and 79, a much greater range of driven speeds can be accurately obtained, than is possible with a single spring, as the latter could not function properly at extreme low speeds and still be responsive to accurately control high driven speeds.

By continued turning of the knob 78 in the direction to retract it on the shaft 79, the knob will abut the stop member 80, and will then act to advance the valve 48 to a position wherein the discharge port 46 will be fully open and the circulation of oil through the pump unrestricted. Thus the hydraulic operative connection between the driving and driven elements will be disrupted so that the driving element will travel idly.

What is claimed is:

1. Mechanism of the class described comprising: a driving element; a driven element; means co-actable with said elements to operatively connect them hydraulically and including valve means by which said connection can be varied to vary the speed of the driven element relative to the driving element; governor mechanism operatively connected to said valve means and responsive to variations in speed of the driven element to so actuate said valve means that said hydraulic connection will be varied to restore the driven element to a predetermined constant speed; means by which the governor mechanism can be adjusted to vary the constant speed at which the driven element will be operated; and means co-actable with the last means to maintain said valve means in a position wherein said hydraulic connection will be disrupted so as to enable the driving element to be operated idly irrespective of the tendency of the governor mechanism to function as aforestated.

2. Mechanism of the class described comprising: a driving element; a driven element; means co-actable with said elements to operatively connect them hydraulically and including valve means by which said connection can be varied to vary the speed of the driven element relative to the driving element; governor mechanism operatively connected to said valve means and responsive to variations in speed of the driven element to so actuate said valve means that said hydraulic connection will be varied to restore the driven element to a predetermined constant speed; means by which the governor mechanism can be adjusted to vary the constant speed at which the driven element will be operated; and means by which said governor mechanism can be rendered ineffective to control the speed of the driven element by locking said valve means in a position wherein said hydraulic operative connection will be disrupted for idle operation of the driving element.

3. Mechanism of the class described comprising: a pumping mechanism including a casing and a rotor working therein to effect circulation of liquid in the casing; valve means co-acting with the pumping mechanism to vary the circulation of liquid so as to vary the speed ratio between the casing and rotor; a liquid containing reservoir in which the casing is rotatably mounted; the casing having a passage the ends of which place the reservoir in communication with the pumping mechanism, and are disposed to co-act with the latter in response to rotation of the casing in the reservoir, to effect circulation of liquid from the reservoir, through the casing and back to the reservoir in sufficient volume to prevent overheating of the liquid by the working of the pumping mechanism.

4. Mechanism of the class described comprising: a pumping mechanism including a casing having liquid circulating passages and a working chamber therebetween in which a rotor operates to effect pumping of liquid through the passages; a liquid containing reservoir in which the casing is rotatably mounted; valve means co-acting with said passages to vary the circulation of liquid, to thereby vary the speed ratio between the casing and rotor; the casing having a passage placing the aforesaid liquid circulating passages in communication with the reservoir liquid at spaced locations around the periphery of the casing for an interchange of liquid between the casing and reservoir during rotation of the casing.

5. In mechanism of the class described, a rotatably mounted pump casing having a working chamber, a valve chamber and suction and discharge passages placing one chamber in communication with the other; a rotor operating in said working chamber between the suction and discharge passages; a valve mounted in the valve chamber to co-act with said passages in varying the circulation of liquid therethrough, to thereby vary the hydraulic connection and hence the speed ratio between the casing and rotor; governor mechanism operatively connected to said valve and including a spring for controlling the valve at low speeds transmitted through said hydraulic connection; and means including a second spring operatively associated with the governor mechanism to control the valve at high speeds transmitted through the hydraulic connection.

6. In mechanism of the class described, a rotatably mounted pump casing having a working chamber, a valve chamber and suction and discharge passages placing one chamber in communication with the other; a rotor operating in said working chamber between the suction and discharge passages; a valve mounted in the valve chamber to coact with said passages in varying the circulation of liquid therethrough, to thereby vary the hydraulic connection and hence the speed ratio between the casing and rotor; governor mechanism operatively connected to said valve and including a spring for controlling the valve at low speeds transmitted through said hydraulic connection; means including a second spring operatively associated with the governor mechanism to control the valve at high speeds transmitted through the hydraulic connection; and means by which the valve can be adjusted to and maintained in a position disrupting the hydraulic operative connection so that the rotor can travel idly in the casing.

7. In mechanism of the class described, driving and driven elements one of which includes a rotatably mounted pump casing and the other a rotor working in the casing; a valve controlling the circulation of liquid in the casing by the rotor; governor mechanism operatively connected to the valve and including a co-acting spring operable to control the valve in maintaining a selected low speed of the driven element; and means including a second spring co-actable with the first spring to control the valve in maintaining a selected high speed of the driven element.

8. In mechanism of the class described, driving and driven elements, one of which includes a rotatably mounted pump casing and the other a rotor working in the casing; a valve controlling the circulation of liquid in the casing by the rotor; governor mechanism operatively connected to the valve and including a co-acting spring operable to control the valve in maintaining a selected low speed of the driven element; means including a second spring co-actable with the first spring to control the valve in maintaining a selected high speed of the driven element; and means by which the valve can be moved to and locked in a position wherein the hydraulic operative connection provided by the circulating liquid between the driving and driven elements will be disrupted to enable the driving element to operate idly.

9. In mechanism of the class described, driving and driven elements, one of which includes a rotatably mounted pump casing and the other a rotor working in the casing; a valve controlling the circulation of liquid in the casing by the rotor; a rod connected to the valve and co-axially related to the axis of rotation of the casing; a spring co-acting with the rod to urge the valve towards one extreme position; a governor operatively associated with one of said elements and said rod to move the valve towards a second extreme position in response to rotation of said one element; an axially adjustable shaft co-axially related and non-rotatively mounted and coupled to said rod; and means including a spring co-actable with said shaft to assist the first mentioned spring in urging the valve as aforestated.

10. In mechanism of the class described, driving and driven elements, one of which includes a rotatably mounted pump casing and the other a rotor working in the casing; a valve controlling the circulation of liquid in the casing by the rotor; a rod connected to the valve and co-axially related to the axis of rotation of the casing; a spring co-acting with the rod to urge the valve towards one extreme position; a governor operatively associated with one of said elements and said rod to move the valve towards a second extreme position in response to rotation of said one element; an axially adjustable shaft co-axially related and non-rotatively mounted and coupled to said rod; means including a spring co-actable with said shaft to assist the first mentioned spring in urging the valve as aforestated; and means by which the loading of the second spring can be varied and means by which the valve rod can be actuated to move the valve to maintain it in a position wherein the hydraulic operative connection provided by the circulating liquid between the driving and driven elements will be disrupted.

EDMUND L. WALL.